R. W. KITTREDGE.
PHOTOGRAPHIC PRINTING APPARATUS.
APPLICATION FILED MAR. 15, 1915.
1,159,955.
Patented Nov. 9, 1915.
3 SHEETS—SHEET 2.
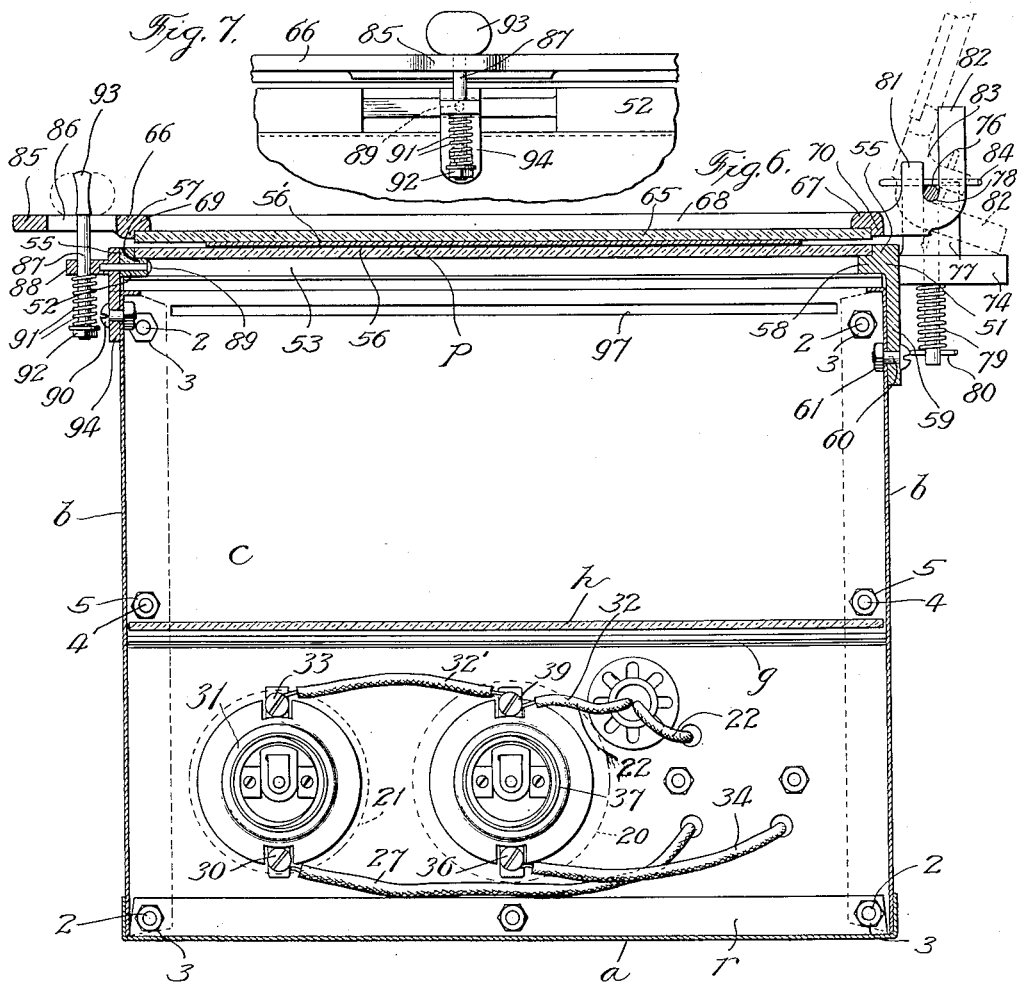
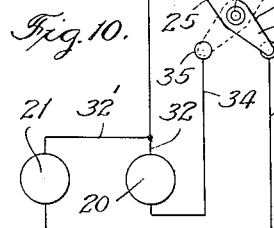
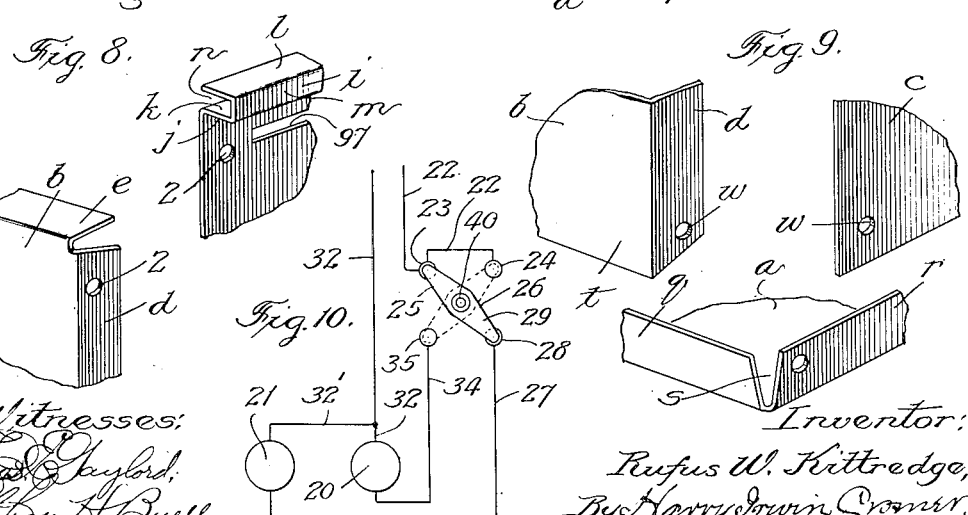
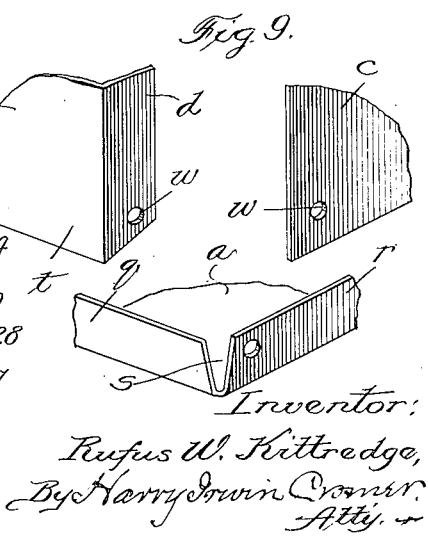
Witnesses:
Inventor:
Rufus W. Kittredge,
By Harry Irwin Cromer,
Atty.

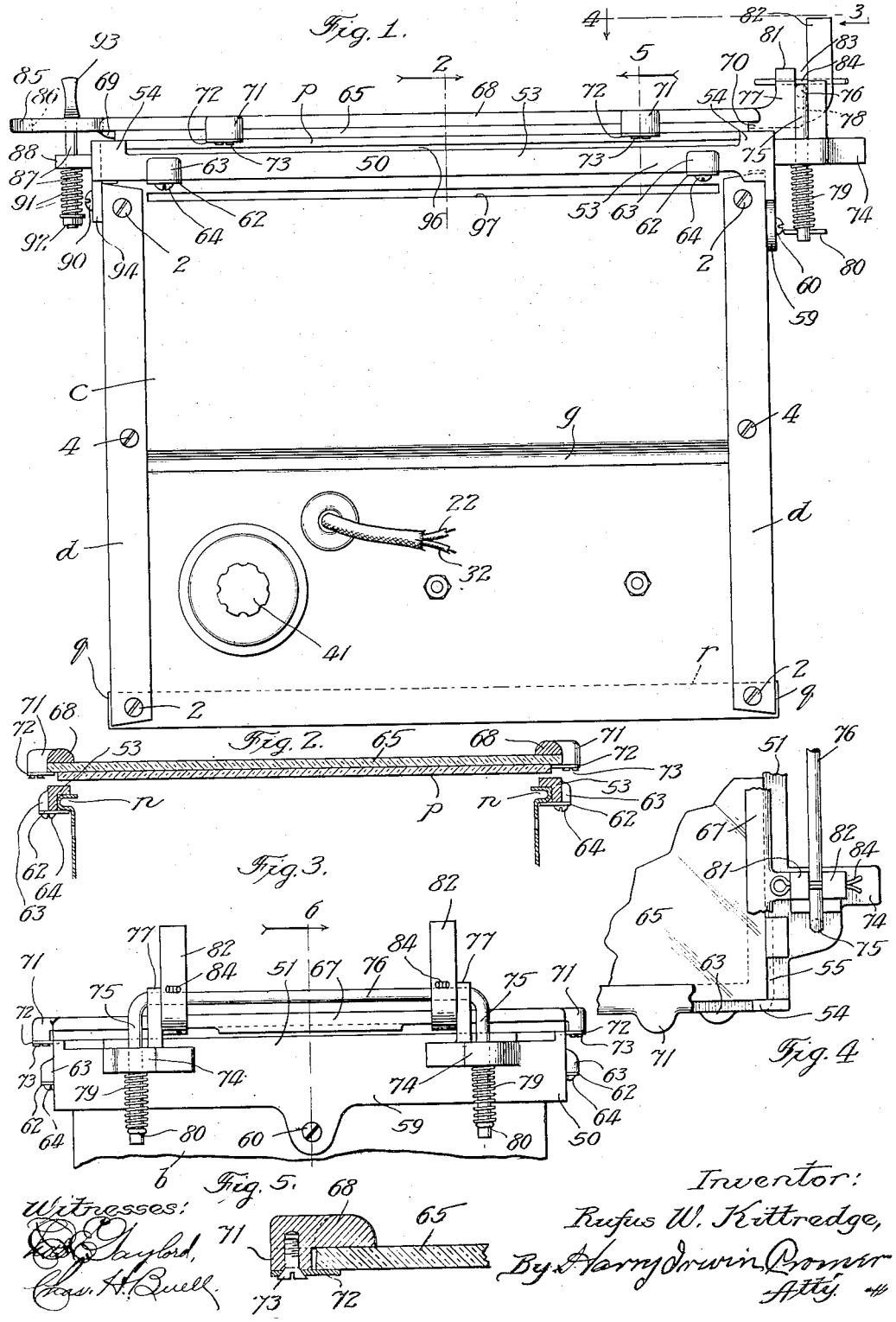

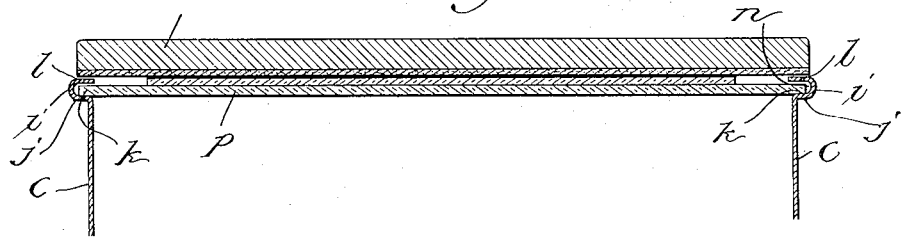

UNITED STATES PATENT OFFICE.

RUFUS W. KITTREDGE, OF CHICAGO, ILLINOIS.

PHOTOGRAPHIC-PRINTING APPARATUS.

1,159,955.  Specification of Letters Patent.  Patented Nov. 9, 1915.

Application filed March 15, 1915. Serial No. 14,372.

*To all whom it may concern:*

Be it known that I, RUFUS W. KITTREDGE, a citizen of the United States, residing in Chicago, in the county of Cook and State of Illinois, have invented certain new and useful Improvements in Photographic-Printing Apparatus, of which the following is a specification.

This invention relates to photographic printing apparatus adapted for use in making photographic prints by means of artificial light.

The principal object of the invention is to provide a simple, economical and efficient photographic apparatus.

A further object of the invention is to provide in a photographic printing apparatus, means adapted to enable a negative or film and a sheet of sensitized paper, to be so held with respect to a light and with respect to each other that the relative positions of the negative and the sensitized paper may be seen and accurately determined by the operator while they are in contact or in printing position between a backing member and supporting plate.

A further object of the invention is to provide a photographic printing apparatus with means adapted to enable a negative and a sheet of sensitized paper to be supported in printing position in such a manner that rays of light are enabled to pass from a lamp-containing compartment through a light-diffusing plate and a light-diffusing compartment, and through the negative supporting plate and backing plate in such a manner that the relative position of the negative and sensitized paper may be seen by the operator while they are held in printing position between the negative supporting plate and the backing plate and the lights may be changed and printing done while the negative and the sensitized paper are in such position; and whereby the strength of the light is enabled to be reduced or partially shut out or stopped-out from a desired portion or area of the negative and print paper by means of a vignetter or shading or stopping-out device in such a manner that the operator is enabled to see what part of the negative is exposed to the strongest light and what part is shaded or affected by a shading device, such as a vignetter or a shutting out device, during the printing operation.

The invention consists in the features, combinations, and details of construction herein described and claimed.

In the accompanying drawings, Figure 1 is a view in side elevation of a photographic printing apparatus, constructed in accordance with my invention and improvements; Fig. 2, a transverse sectional view in detail taken on line 2 of Fig. 1 looking in the direction of the arrow, and showing a transparent backing-plate and its hinged supporting frame and the negative supporting plate and upper portion of the casing or printing box in section; Fig. 3, an end view in elevation showing the upper portion of the printing apparatus shown in Fig. 1, as it would appear looking from the right of Fig. 1; Fig. 4, a detail plan view of an upper corner portion of the apparatus shown in Fig. 1, showing the hinge mechanism for the frame which supports the transparent backing plate; Fig. 5, an enlarged detail view taken on line 5, of Fig. 1, looking in the direction of the arrow, showing one side the backing plate supporting frame and a plate engaging finger or lug; Fig. 6, a vertical longitudinal sectional view through the center of the apparatus, taken on line 6 of Fig. 3, looking in the direction of the arrow, and showing the transparent backing plate and its supporting frame and the negative-supporting frame in longitudinal section, and the spring-pressed hinge mechanism and securing devices; Fig. 7, a detail view in end elevation, showing the spring-pressed securing means for yieldingly holding the backing plate frame down, and the means for securing the front end of the negative-supporting frame to the casing or box. Fig. 8, an enlarged detail view of the upper corner portions of a vertical side and end member of the casing or box. Fig. 9, an enlarged detail view, showing one corner of the bottom member with its upwardly extending securing flanges, the corresponding lower part of the end wall member and the bottom extremity of the corresponding side wall member; Fig. 10, a diagrammatic view of the electric circuit and connections for the lamps; Fig. 11, a central transverse sectional view of the casing or printing box shown in Fig. 1, as it would appear taken on line 2 of said figure, but with a transparent negative-supporting glass or plate in the grooves at the upper extremities of the side wall members, and with a transparent backing plate in a hinged supporting frame which is secured directly to the sheet metal printing box body or casing; Fig. 12, a central transverse sectional view of the upper part of the box or casing shown in Figs. 1, 6 and 11, showing a transparent negative-supporting plate in the side grooves, and showing a common form of backing plate or cover.

In constructing a photographic printing apparatus in accordance with my invention and improvements, I provide a casing or box having a body portion formed, by preference, entirely of sheet metal, and comprising a bottom member *a*, end wall members *b*, and side wall members *c*. The end wall members or plates shown in the drawings are of identical construction, each being provided at its opposite vertical margins or end edges, with flanges *d*, which extend at right angles with respect to the surfaces of the main body portions of said end wall members, respectively, and in the direction of the opposite end wall. Said flanges are adapted to extend on the outside and overlap the vertical or end margins of the adjacent or corresponding side wall members *c*. (See Figs. 1 and 9). Each of the end wall members is provided with an inwardly projecting horizontal flange or shelf *e* at its upper margin or extremity. (See Figs. 6, 8 and 11). These upper horizontal flanges of the end wall members extend at right angles with respect to the upright flanges *d* and in perpendicular relation to the inner surfaces of the end members or plates of which they form a part, and are cut away at their opposite ends or extremities *f*, or, in other words, made of slightly less length than the longest main body portion of the end plate, so that the ends *f* extend inside of and are in abutting engagement with the adjacent inner surfaces of the side wall members *c*. (See Figs. 1 and 8.) Each of the vertical edges or end extremities of each side wall member thus extends between the end of a horizontal flange *e*, and a vertical over-lapping outer flange *d* of an end wall member *b*.

The side wall members *c* are provided with inner horizontal ledges or shelves *g*, which extend in the same horizontal plane on opposite sides of the box body and form supporting ledges, shelves or ribs upon which rests a horizontal light-diffusing plate *h*, formed, by preference, of ground glass or similar suitable material for separating the interior space, and diffusing the rays of light during the operation of printing.

Each side wall member *c* is also provided with an outwardly projecting horizontal grooved flange or channel *i*, comprising a bottom wall or flange portion *j*, which projects outwardly from the upper edge or margin of the side wall member *c* of which it forms a part, its upper or inner surface *k*, being in the same horizontal plane with the upper surface of the horizontal inner flanges *e* of the end wall members *b*. Each of said grooved flange-portions *i* has an upper, inwardly extending flange portion *l*, which is bent inwardly from the outer vertical portion *m*, and is located, by preference, entirely outside of, or with its inner edge flush with or laterally beyond the vertical plane in which the inner surface of the side wall member is located. A horizontal channel or groove *n*, is thus provided which opens inwardly and is adapted to admit the side marginal portion or edge *o* of a transparent, negative-supporting plate or glass *p*, (see Fig. 11) which is mounted in said groove *n*. The grooved flange *i* and horizontal flanges *e* of the end members, are thus adapted to support the plate *p* and also to provide the desired rigidity and strength of the side wall members and the structure as a whole.

The flanges *i* are also adapted to support and hold in operative position the metallic frame for holding the negative supporting plate or glass and with which the hinged frame for supporting the transparent backing plate is connected, as hereinafter more particularly described. The bottom member *a* is provided at its opposite ends with upwardly projecting, outer flanges *q*, and, at each of its side margins, with a similar, upwardly projecting, inner flange *r*, the extremities of said flanges being cut away so as to provide a space *s* therebetween for admitting an upright wall portion of the casing, as shown in Fig. 9. The end flange *q* extends outside of and overlaps the corresponding bottom extremity *t* of the adjacent end wall member *b*. (See Figs 1, 7, and 9.) The end and side wall members and bottom members are provided with apertures *w*, through which are inserted headed bolts or rivets 2, which are securely held in position by means of threaded nuts 3, or similar suitable securing means. Headed bolts 4, having nuts 5 in threaded engagement with the inner ends thereof, extend through the side wall members *c* and the vertical end flanges *d* of the end wall members just above the light-diffusing, ground glass plate. These nuts engage the plate and serve to hold the plate *h* in position between the nuts and the shelving. This plate *h* divides the space within the casing so as to form a bottom, lamp-containing chamber or compartment 6, and an upper light-diffusing chamber or compartment 7, the latter being located between the lamp compartment 6 and the negative supporting plate *p*.

In the form of the device shown in the accompanying drawings, the light for printing is furnished by means of an electric lamp or white light 20 located in the lamp-containing compartment 6, beneath the light-diffusing plate or ground glass $h$. An electric lamp 21, having a ruby bulb or similar means for preventing injury to the sensitized paper when exposed to the rays of light for enabling the operator to see and determine the positions of the negative and sensitized paper, is also mounted in the lamp-containing chamber or compartment 6. These lamps are connected with a suitable source of electric supply by means of electrical conductors which, when constructed as shown in the drawings, are adapted to enable one lamp to be lighted and the other cut out and vice-versa, by the operation of a single switch or key, and by a single operation.

The electrical conductors shown are adapted to form an electric circuit comprising a wire 22 connected with one pole of an electric circuit or source of electrical supply and having contacts 23 and 24 adapted to be alternately engaged by the arm 25 of a switch 26. A wire 27 is connected with a contact 28, which is located in position to be engaged by the arm 29 of the switch 26, when the switch is in contact with said contact 23. Wire 28 is connected with a pole or contact 30 of the socket 31 of lamp 21. (See Figs. 6 and 11.) A wire 32' is connected with the other contact member or pole 33 of the lamp socket 31, and with wire 32 which leads to the opposite pole of the electric supply circuit or source of electric supply with which said wire 32 is connected. A wire 34 is provided, which is connected at one extremity with a contact member 35 and at its opposite extremity with a contact member 36 of a socket 37 of the lamp 20, and the opposite contact member 39 of the last mentioned socket member is connected with the wire 32. (See Figs. 6 and 10.) The switch member 26 is pivotally mounted upon a pin or pivot 40, and is provided with a thumb nut 41 by means of which said switch member is rotated. (See Fig. 1.)

When the switch 26 is in the position shown in Fig. 10, a closed circuit is formed which causes the current of electricity to pass through wire 22, contact 23, switch member 26, contact 28, wire 27, colored or ruby lamp 21 and wire 32 and without passing through the lamp 20. When the switch 26 is reversed, or in the position in which it is shown in broken lines in Fig. 2, an electric circuit is formed, through wire 22, contact 24, switch 26, contact 35, wire 34, white lamp 20 and wire 32, and without causing an electric current to pass through the colored or ruby lamp 21, or the part of the circuit connecting the contact 28 with the lamp 21 and wire 32'. It will thus be seen that by turning the electric switch 26 to the position shown in Fig. 2, the colored or ruby lamp 21 will be lighted and the lamp 20 extinguished by a single operation; and that by turning said switch into position to connect with the contacts 24 and 35, the lamp 20 will be lighted and the colored or ruby lamp 21 cut out or extinguished by a single operation, and that this is accomplished by means of a single switch and by means of a circuit which is connected with the opposite poles of a single supply circuit or source of electric supply.

In the form of the device shown in Figs. 1 to 9, inclusive, a rectangular metallic frame 50 is provided which comprises end frame portions 51, 52, and longitudinal side frame portions 53, having upwardly projecting side flange portions 54 and upwardly projecting end flange portions 55, between which the transparent negative supporting plate $p$ is adapted to be laid in position to be supported by inwardly extending ribs, flanges or frame portions 57 and 58. The frame 50 is thus formed, by preference, in one integral piece and is adapted to provide an opening across which the plate $p$ extends so as to support a negative or film 56 and a sheet of sensitized paper 56' in printing position. (See Fig. 6.) This frame 50 rests upon the longitudinal, laterally projecting grooved flanges $i$, and is provided at one extremity with a transverse depending end frame portion 59, which is adapted to extend downwardly on the outside of the corresponding end wall $b$ of the casing or printing box. Said frame portion 59 is removably secured to the end wall $b$ by means of a bolt 60 and nut 61. (See Fig. 6.) Depending or securing lugs or fingers 62 extend inwardly from lateral frame portions or bosses 63 on opposite sides of the metallic frame 50. These securing lugs or fingers may be secured to the frame 50 by means of screws 64, or may be made in one integral piece with the frame 50, and are adapted to extend beneath and engage the underside portion $j$ of the corresponding grooved flange portion $i$ in such a manner as to permit the frame 50 with its lugs or fingers 62 to slide longitudinally of the flanges $i$ into operative position upon the main casing.

A backing plate 65, made by preference of transparent glass, is mounted in a metallic supporting frame which consists of transverse end frame portions 66, 67 and side frame portions 68, having depending end lugs or flanges 69, 70, and depending side lugs or flange portions 71. These depending lugs are adapted to engage the corresponding abutting edges of the glass or transparent backing plate 65, which is held in position by inwardly projecting plate engaging fingers or lugs 72, which are secured to the side lugs or flange portions 71 by means of screws 73, or other suitable securing means. The lugs or fingers 72 extend inward beneath the adjacent marginal portions of the backing-plate 65 so as to securely hold the latter in place between said lugs and the upper inwardly extending side frame portions 68, (see Figs. 1, 2, 3 and 5). The backing plate is of greater dimensions than the negative supporting plate *p*, transversely or lengthwise or both, (see Figs. 1, 2 and 7). The fingers or lugs 72 are thus enabled to extend beneath a projecting marginal portion of the backing plate in such manner that there will be no obstruction between the backing plate and negative-supporting plate.

The negative supporting frame is provided with outwardly projecting end bosses 74, having vertical perforations therein, through which extend depending vertical end portions 75 of a pivot rod or hinge member 76. The main body portion of this rod or pintle is in horizontal position and in transverse relation to the backing plate frame and negative supporting frame to be pivotally connected or hinged together by the hinge mechanism of which said pivot rod forms a part, (see Figs. 1, 3 and 4).

Upright guiding arms or hinge members 77 are provided which extend upward from and may be integral with the bosses 74 respectively, so as to form vertically elongated slots or openings 78, in which the horizontal portion of the pivot rod 76 is slidably mounted so as to permit its upward and downward movement, and a corresponding movement or adjustment of the hinged backing plate frame. (See Figs. 1, 3, 4 and 7).

The depending vertical end portions 75 of the pintle or pivot rod member which are slidable vertically in the perforated frame portions or bosses 74, are provided with compressible springs 79, mounted thereon below and in engagement with the bosses 74, the lower ends of said springs being in engagement with heads or cotton pins 80, or similar equivalent spring engaging means adapted to enable the springs to tend to press the pivot rod downward, and to permit and yieldingly resist the upward movement of the pintle or rod 76, and with it the backing plate frame. Hinge members 81 and 82, on or integral with the backing plate frame, project endwise beyond and upward at an angle with respect to the main body of the backing plate frame. Tranverse openings 83 are thus provided through which the transverse horizontal portion of the pivot rod 76 extends. Said rod is held in place in the openings 83 by means of pins 84 which extend across said openings and over the pivot rod. (See Figs. 1 and 7). The hinge mechanism thus formed is adapted to pivotally connect the backing plate frame with the negative supporting frame and to enable the backing plate and negative supporting plate to be yieldingly held in parallel relation at varying distances from each other, as herein elsewhere suggested.

The hinged backing plate frame is provided at its free or upwardly swinging end with an endwise projecting portion 85 having an elongated slot 86 therein, and a securing pin 87, is secured to the negative supporting frame in position to extend upwardly through said elongated slot when the hinged frame is in lowered or closed operative position. (See Figs. 6 and 7). This normally vertical pin 87 is slidably mounted in a perforated supporting member 88, which is connected with or forms a part of the negative supporting frame. When constructed, as shown in the drawings, (see Fig. 7), the pin supporting member 88 is pivotally connected with the negative supporting frame by means of a horizontal pivot pin 89 which is anchored or rotatable in the end frame member 52. The member 88, as shown, has an integral depending lug or flange portion 94 which is, by preference, perforated and adapted to be secured to the end wall *b* of the sheet metal casing by means of a bolt 90.

The pivot member, comprising parts 88 and 94, is thus adapted to be turned on the pivot 89 from the upright position in which it is shown in Figs. 6 and 7 to a horizontal position in transverse relation to the hinged frame, with the part 94 and pin 87 in horizontal position so as to permit the hinged frames to be moved endwise on the guides or flanges *i* into and out of position on the casing. (See Fig. 1).

A compressible spring 91 is mounted on the pin 87, in engagement with the under side of the perforated member 88, and has its lower end in engagement with the end collar 92, or with similar means for operatively connecting the spring with said pin. The spring is thus adapted to yieldingly resist the upward movement of the pin 87 and the backing plate frame and tend to press the latter downward. The pin 87 is provided at its upper end with an elongated head or button portion 93, which is adapted to pass through the elongated slot 86, but when turned into position at right angles to the elongated slot, as shown in Figs. 6 and 7, it will extend across the slot and will be prevented from passing through.

Side slots 96 and 97, in the opposite sides of the apparatus below the level of the negative supporting plate, are adapted to enable a stopping-out or shading device or card to be inserted below the negative supporting plate, or between the negative and the light, so as to shut out or reduce the intensity of the light passing through any desired portion of the negative. The transparent backing plate, with these slots, thus enables the operator to see and accurately determine and control the extent to which the light is shut out or reduced and the exact area affected by the stopping-out device or vignetter, while the negative and the sensitized paper are actually in position for printing or during the operation of printing.

In Fig. 11, the sheet metal casing or printing box body is of the same construction as that shown in Figs. 1 to 4 and 6 and 7, and the transparent backing plate 65 is shown supported by means of a hinged supporting frame of substantially identical construction with that comprising parts 67, 68, 81 and 82, as above described, and as shown in said figures. The end frame portion 59 and hinged mechanism shown in Fig. 11, are of substantially identical construction with the corresponding end frame portion 59 and hinge mechanism shown in Figs. 1, 3 and 4, but with the negative supporting frame portions 52, 53, 57 and 58 omitted. The backing plate 65 is thus supported in its hinged frame in position to be movable into and out of contact with the plate $p$ when the latter is mounted in the grooves $n$ of the channel portions $i$, and to hold a film or negative 56 and a sheet of sensitized paper 56′ between said backing plate and the negative supporting plate, when the latter is mounted directly in said grooves in the sheet metal casing or printing box.

In an apparatus constructed as above described, and shown in Figs. 1 to 7, the hinged backing plate frame and negative supporting frame are adapted to be operatively connected by means of hinges and yielding securing means adapted to hold the plates in parallel relation at varying distances from each other or with negatives in the form of films or relatively thick plates therebetween, and all of the parts for operatively connecting said frames are so constructed as to be assembled with facility while separate from the printing box-body or casing.

The connected and assembled plate supporting frames and parts may thus be shipped and handled independently of the box-body, and readily removed and replaced, or removably secured in operative position upon the desired box-body, or casing.

I claim:

1. A photo-printing apparatus of the class described, comprising in its construction an upper backing-plate supporting frame, a lower plate supporting frame, means for connecting said frames, a transparent negative supporting plate mounted in the lower frame, and a backing-plate formed of transparent material mounted in the upper frame and adapted to hold a sheet of sensitized paper and a negative in printing position between said transparent backing-plate and the negative supporting plate.

2. In a photo-printing apparatus of the class described, the combination of an upper backing-plate supporting frame, a lower plate supporting member, a transparent negative supporting plate mounted in the lower plate supporting member, a backing-plate formed of transparent material mounted in said upper frame and adapted to hold a sheet of sensitized paper and a negative in printing position between the backing plate and negative supporting plate, and means for pivotally connecting said upper and lower plate supporting members.

3. In a photo-printing apparatus of the class described, the combination of a metallic backing-plate supporting frame, a transparent backing-plate mounted in said backing-plate supporting frame, a metallic printing box body, comprising a bottom member and side and end walls formed of sheet metal adapted to form a lamp containing compartment, a transparent negative supporting plate located between the transparent backing-plate and the lamp containing compartment, and means for pivotally securing the backing-plate supporting frame in position to hold a sheet of sensitized paper and a negative in printing position between the transparent backing-plate and the transparent negative supporting plate.

4. In a photo-printing apparatus of the class described, the combination of a casing having side and end walls formed of sheet metal and provided with a lamp-containing compartment, a backing-plate supporting frame, a backing-plate formed of transparent material mounted in said backing-plate supporting frame, a negative supporting plate, means for supporting said negative supporting plate in position to extend between the transparent backing-plate and the lamp containing compartment, and hinge mechanism for pivotally holding said backing-plate frame and its transparent plate in operative position.

5. In a photo-printing apparatus of the class described, the combination of a casing having side and end walls formed of sheet metal and provided with a lamp-containing compartment, a backing-plate supporting frame, a backing-plate formed of transparent material mounted in said backing-plate supporting frame, a negative supporting plate, horizontal lateral flanges on the upper side marginal portions of the walls of the casing, and securing means adapted to engage said negative supporting plate and said flanges, for holding the negative supporting plate in position to extend between the backing-plate and the lamp-containing compartment.

6. In a photo-printing apparatus of the class described, the combination of a casing having side and end walls formed of sheet metal and provided with a lamp-containing compartment, a backing-plate supporting frame, a backing-plate formed of transparent material mounted in said backing-plate supporting frame, a negative supporting plate, means for supporting said negative supporting plate in position to extend between the transparent backing-plate and the lamp-containing compartment, said last mentioned plate supporting means being provided with a lateral slot located below the level of the negative supporting plate and adapted to enable a piece of sheet material to be inserted between the lamp compartment and any desired portion of the negative supporting plate and negative, and hinge mechanism for pivotally supporting said backing-plate frame and its transparent backing-plate in operative position.

7. In a photo-printing apparatus of the class described, the combination of an upper backing-plate supporting member, a lower plate supporting frame member, a transparent negative supporting plate mounted in said lower frame member, a backing-plate supported by said upper plate-supporting member and adapted to hold a sheet of sensitized paper and negative in printing position between said backing-plate and negative supporting plate, hinge mechanism for pivotally connecting said upper and lower plate-supporting members, and depending securing means on the marginal portions of the lower plate-supporting frame member for securing the same to a printing box body.

8. In a photo-printing apparatus of the class described, the combination of an upper backing-plate supporting member, a lower plate-supporting frame member, a transparent negative supporting plate mounted in said lower plate-supporting frame member, a backing-plate supported by said upper plate-supporting member and adapted to hold a sheet of sensitized paper and a negative in printing position between the backing-plate and negative supporting plate, hinge members on said upper and lower plate-supporting members, a pivot rod in sliding engagement with a hinge member of one of said plate-supporting members, and forming a pivotal connection between said hinge members, and spring mechanism in engagement with said pivot rod and with a hinge portion of one of said plate-supporting members and adapted to yieldingly press the backing plate in the direction of the negative-supporting plate.

9. In a photo-printing apparatus of the class described, the combination of an upper backing-plate supporting frame, a backing-plate mounted in said frame, a lower plate supporting frame member, hinge members upon said upper and lower plate-supporting frames respectively, a pivot rod having horizontal body portions in pivotal engagement with the hinge members of said upper and lower plate supporting frame members and having end portions at right angles to said horizontal body portion and extending through and in sliding engagement with the hinge members of one of said plate-supporting frames, and spring mechanism mounted on said pivot rod and in engagement with the adjacent hinge members through which the upright portions of the pivot rod extend.

10. In a photo-printing apparatus of the class described, the combination of a sheet metal casing, a lamp mounted in said casing, means for connecting said lamp with a source of electric supply, a negative supporting plate, means for securing the negative supporting plate in position in the casing, an upper backing-plate supporting frame member, a backing-plate of transparent material supported by said frame member and adapted to hold a sheet of sensitized paper and a negative in printing position between the transparent backing-plate and the negative supporting plate and lamp, and a light-diffusing ground glass plate mounted between the negative supporting plate and the lamp, in position to divide the space inclosed by the casing into a lamp compartment and a light-diffusing compartment.

11. In a photo-printing apparatus of the class described, the combination of a casing having side and end walls formed of sheet metal, the side walls being bent to form lateral horizontal flanges having inwardly facing grooves adapted to engage a plate to be supported thereby, a backing-plate located above the level of said grooved flanges, and securing means connected with the casing and with the backing-plate and adapted to form a pivotal connection between said backing-plate and casing.

RUFUS W. KITTREDGE.

Witnesses:
HARRY IRWIN CROMER,
JENNIE L. FISKE.